US011750334B2

(12) United States Patent
Nakano

(10) Patent No.: US 11,750,334 B2
(45) Date of Patent: Sep. 5, 2023

(54) DATA COLLECTION MANAGEMENT DEVICE AND DATA COLLECTION SYSTEM

(71) Applicant: Mitsubishi Electric Corporation, Tokyo (JP)

(72) Inventor: Yuki Nakano, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/782,997

(22) PCT Filed: Dec. 25, 2019

(86) PCT No.: PCT/JP2019/050876

§ 371 (c)(1),
(2) Date: Jun. 7, 2022

(87) PCT Pub. No.: WO2021/130912

PCT Pub. Date: Jul. 1, 2021

(65) Prior Publication Data

US 2023/0012635 A1     Jan. 19, 2023

(51) Int. Cl.
*H04L 1/00*         (2006.01)
*H04L 1/1812*      (2023.01)
(Continued)

(52) U.S. Cl.
CPC .......... *H04L 1/1816* (2013.01); *H04L 65/611* (2022.05); *G06F 11/1402* (2013.01); *G06F 2201/875* (2013.01)

(58) Field of Classification Search
CPC .. H04L 1/1816; H04L 65/611; G06F 11/1402; G06F 2201/875
See application file for complete search history.

(56) References Cited

U.S. PATENT DOCUMENTS 5,517,669 A * 5/1996 Ohkura ................... G06F 13/36
710/52
8,938,772 B2 * 1/2015 Shirasuka .......... H04N 21/4383
725/139
(Continued)

FOREIGN PATENT DOCUMENTS

JP         4-167795 A      6/1992
JP         6-168222 A      6/1994
(Continued)

OTHER PUBLICATIONS

International Search Report and Written Opinion dated Feb. 10, 2020, received for PCT Application PCT/JP2019/050876, Filed on Dec. 25, 2019, 8 pages including English Translation.
(Continued)

*Primary Examiner* — April Y Blair
*Assistant Examiner* — Rong Tang
(74) *Attorney, Agent, or Firm* — XSENSUS LLP

(57) ABSTRACT

The data collection management device (10) is connected via a network to a plurality of communication devices (20) performing cyclic communication and includes: a network configuration storage (17) to store network configuration information indicating the communication devices participating in the cyclic communication; a data receiving unit (11) to receive communication data multicast from each communication device (20); a received data storage (12) to store the received communication data as collected data; a received data determination unit (13) to determine whether there is missing data in the collected data and identify unreceived communication data, based on information specifying communication cycles included in the collected data, on information specifying sender communication devices included in the collected data, and on network configuration information; and a retransmission requesting unit (15) to transmit a retransmission request of the unre- (Continued)

ceived communication data to one of the plurality of communication devices (20).

8 Claims, 14 Drawing Sheets

(51) Int. Cl.
*H04L 65/611* (2022.01)
*G06F 11/14* (2006.01)

(56) References Cited

U.S. PATENT DOCUMENTS

| | | | |
|---|---|---|---|
| 2006/0007852 A1* | 1/2006 | Brueckner | H04L 45/66 370/216 |
| 2011/0238773 A1* | 9/2011 | Nakamura | H04L 12/433 709/208 |
| 2012/0185592 A1* | 7/2012 | Nakamura | H04L 43/00 709/224 |
| 2020/0244594 A1 | 7/2020 | Yoneda | |

FOREIGN PATENT DOCUMENTS

| | | |
|---|---|---|
| JP | 7-38593 A | 2/1995 |
| JP | 9-26943 A | 1/1997 |
| JP | 2009-141473 A | 6/2009 |
| JP | 2016-31554 A | 3/2016 |
| JP | 2019-80164 A | 5/2019 |
| JP | 6570804 B1 | 9/2019 |
| WO | 2019/065015 A1 | 4/2019 |

OTHER PUBLICATIONS

Notice of Reasons for Refusal dated May 26, 2020, received for JP Application 2020-515991, 7 pages including English Translation.
Decision of Refusal dated Oct. 20, 2020, received for JP Application 2020-515991, 5 pages including English Translation.
English translation of Written Opinion dated Feb. 10, 2020, received for PCT Application PCT/JP2019/050876, 4 pages with Verification.
Office Action dated Mar. 31, 2023 in corresponding Chinese Patent Application No. 201980103173.7, 9 pages.
Chinese Office Action dated Nov. 11, 2022 in corresponding Chinese Patent Application No. 201980103173.7 (with machine-generated English translation), 13 pages.

* cited by examiner

Fig. 8

| Station number | Cycle number | Error detection code | Real data |
|---|---|---|---|
| 0 | 1 | ... | ... |
| 1 | 1 | ... | ... |
| 2 | 1 | ... | ... |
| 0 | 2 | ... | ... |
| 1 | 2 | ... | ... |
| 2 | 2 | ... | ... |
| 0 | 3 | ... | ... |
| 1 | 3 | ... | ... |
| 2 | 3 | ... | ... |

Fig. 9

| Station number | Station type | Address | Memory amount |
|---|---|---|---|
| 0 | Master | 192.168.10.1 | 512MB |
| 1 | Slave | 192.168.10.2 | 128MB |
| 2 | Slave | 192.168.10.3 | 128MB |

Fig. 10

| Station number | Cycle number | Determination result |
|---|---|---|
| 0 | 1 | Normal |
| 1 | 1 | Normal |
| 2 | 1 | Normal |
| 0 | 2 | Normal |
| 1 | 2 | Normal |
| 2 | 2 | Normal |
| ... | ... | ... |
| 0 | N | Normal |
| 1 | N | Normal |
| 2 | N | Unreceived |
| ... | ... | ... |
| 0 | M | Normal |
| 1 | M | Anomaly |
| 2 | M | Normal |

DATA COLLECTION MANAGEMENT DEVICE AND DATA COLLECTION SYSTEM

CROSS-REFERENCE TO RELATED APPLICATION

The present application is based on PCT filing PCT/JP2019/050876, filed Dec. 25, 2019, the entire contents of which is incorporated herein by reference.

TECHNICAL FIELD

This disclosure relates to a data collection management device and a data collection system.

BACKGROUND TECHNOLOGY

In facilities such as factories, systems where a plurality of devices are controlled via a communication network are operated. In recent years, in systems like these, in order to realize high speed stable control communication, the cyclic communication in which a plurality of devices transmits and receives data at short intervals under high-precision time synchronization is sometimes adopted. Then, the data management device which is directly or indirectly connected to the communication network analyzes the data outputted from devices to monitor the operating status of the devices, to analyze the cause of anomaly when it occurs, to predict failures of devices, and so on.

Patent document 1 discloses a data collection device that collects data without increasing loads on the network and the master controller in a network system where data are regularly exchanged between the master controller and a plurality of slave devices via the real-time ethernet (registered trademark). This data collection device includes a data processing unit that extracts input/output data from the MAC frames transmitted and received between the master controller and the slave devices on the real-time ethernet without outputting any data to the real-time ethernet, and includes a data management unit that manages the data collected by the data processing, thereby making it possible to collect and analyze the data with a single device.

PRIOR ART LITERATURE

Patent Documents

[Patent Document 1] Unexamined Patent Application Publication JP, 2016-031554

SUMMARY OF THE INVENTION

Problems to be Solved by the Invention

A device to perform high-speed cyclic communication requires installation of a real-time OS that can ensure punctuality. On the other hand, a device to perform data analysis requires installation of a general-purpose OS (non-real-time OS), which is suitable for heavy-duty calculations. A device with a general-purpose OS installed, however, cannot ensure the punctuality of the processing due to the nature of the OS.

The data collection device of Patent Document 1 includes a general personal computer (PC) with a general-purpose OS installed. Therefore, this data collection device cannot ensure the punctuality of processing, possibly resulting in an uncomplete data reception of the input/output data, such as a case of an unfinished data reception within a designated period.

This disclosure is made in view of the above problems and aims to improve the reliability of the data collection.

Solutions to Problem

To achieve the above objective, the data collection management device according to this disclosure, which is connected via a network to a plurality of communication devices performing cyclic communication to share storage data stored in storages, includes: a network configuration storage to store network configuration information for identifying the plurality of communication devices participating in the cyclic communication; a data receiving unit to receive communication data which is multicast in the cyclic communication from each of the plurality of communication devices; a received data storage to store the communication data received by the data receiving unit as collected data; a received data determination unit to determine whether there is missing data in the collected data and identify the communication cycle and the sender communication device of unreceived communication data, based on information, included in the collected data, representing which of a plurality of communication cycles in the cyclic communication the communication data belong to, on information, included in the collected data, representing sender communication devices of the communication data, and on the network configuration information; and a retransmission requesting unit to request retransmission of the communication data identified by the received data determination unit as not being received to one of the plurality of communication devices when it is determined in the received data determination unit that there is missing data in the collected data.

Advantageous Effects of Invention

The data collection management device according to this disclosure does not participate in the cyclic communication between the communication devices but collects the communication data by receiving data multicast from each of the communication devices participating in the cyclic communication. In doing so, this data collection management device is able to identify the missing data and is able to reacquire the missing communication data by requesting the retransmission of the missing data to one of the communication devices. Therefore, it is possible to enhance the reliability of the data collection.

BRIEF DESCRIPTION OF THE DRAWINGS

FIG. 8 is a table showing an example of collected data according to the embodiment.

FIG. 9 is a table showing an example of network configuration information according to the embodiment.

FIG. 10 is a table showing an example of determination result data according to the embodiment.

DESCRIPTION OF EMBODIMENTS

Hereinafter, the data collection system 1000 according to the embodiment of this disclosure will be described in detail with reference to the drawings.

Embodiment

Figure 1:
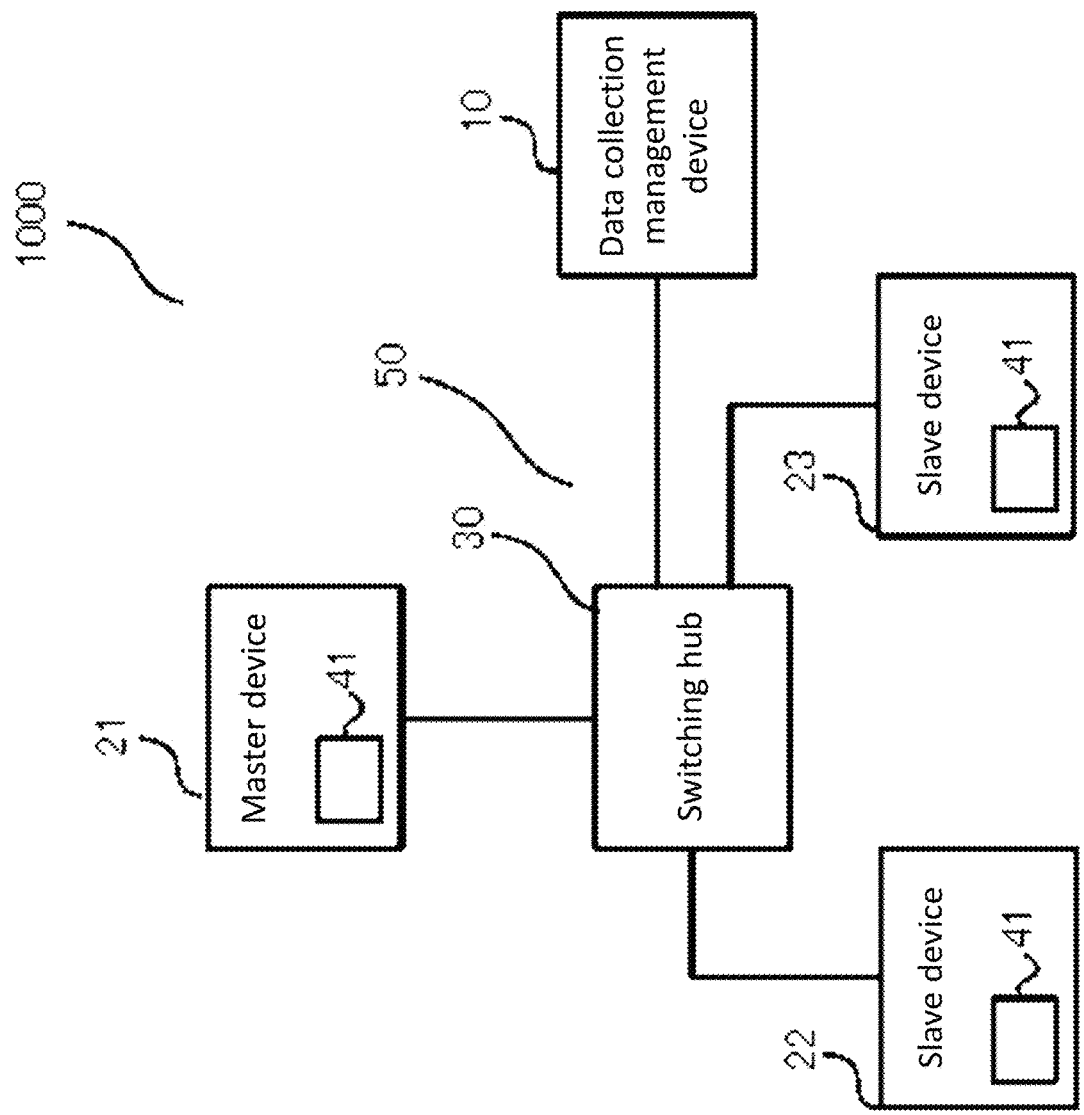
FIG. 1 is a diagram showing a configuration of a data collection system according to the embodiment.

The data collection system 1000 corresponds to a part of FA systems set up in a factory. The data collection system 1000 is organized by connecting the devices that are included in the FA systems, such as a production system, an inspection system, a processing system, and other systems, via communication lines. As shown in FIG. 1, the data collection system 1000 includes a data collection management device 10, a master device 21, slave devices 22, 23 and a switching hub 30.
In the following, the master device 21 and the slave devices 22, 23 are collectively referred to as communication devices 20.

The data collection management device 10 is, for example, an industrial personal computer. The master device 21 and the slave devices 22, 23 are, for example, programmable logic controllers (PLCs) or devices that work with a PLC. The data collection management device 10, the master device 21, and the slave devices 22, 23 are connected to each other via a communication network 50 including the switching hub 30.

The master device 21 corresponds to the master node of the data collection system 1000, and the slave devices 22 and 23 correspond to the slave nodes thereof. The master device 21 transmits control instructions for the slave devices 22 and 23 via the communication network. The slave devices 22 and 23 each control a device (not shown) connected to them according to the control instructions. The device to be controlled is, for example, a sensor device, an actuator, or a robot.

Figure 2:
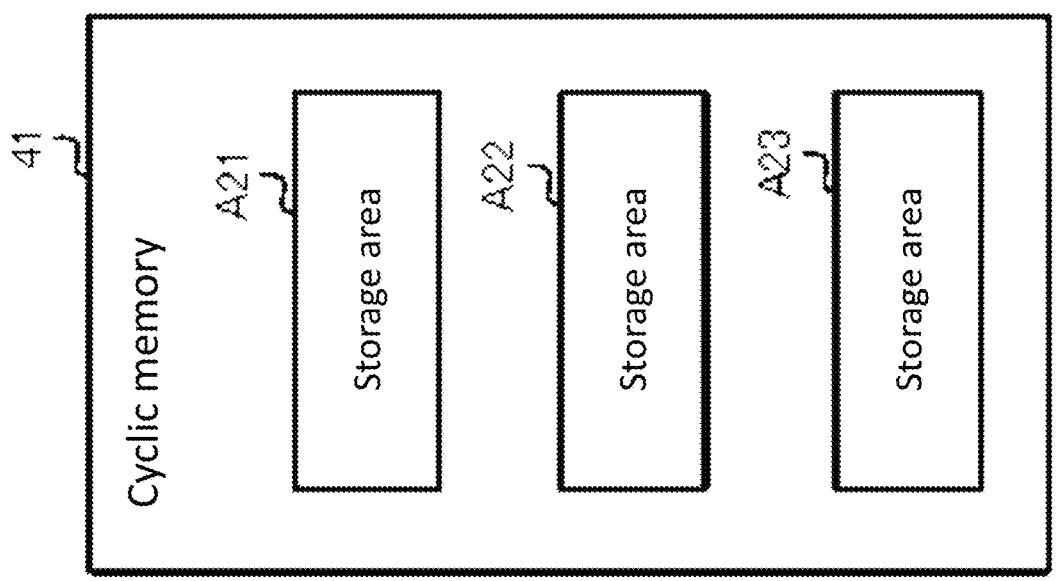
FIG. 2 is a diagram showing a cyclic memory according to the embodiment.

Each of the communication devices 20 includes cyclic memory 41 to store the data to be shared by them. The cyclic memory 41 includes storage areas each assigned for one of the communication devices 20. In detail, as shown in FIG. 2, the cyclic memory 41 includes the storage area A21 assigned for the master device 21, the storage area A22 assigned for the slave device 22, and the storage area A23 assigned for the slave device 23. Each of these storage areas stores the data updated by the communication device 20 for which the area is assigned. For example, the storage area A21 stores only the data updated by the master device 21, and the data stored in the storage area A21 is not updated by the slave device 22 or 23. The data stored in the storage areas A21, A22, and A23 is held in a structure for FIFO (First-In First-Out). Therefore, when the data is updated, the oldest data is deleted first. The cyclic memory 41 is an example of storage that stores data to be shared by the master device 21 and the slave devices 22, 23. The data stored in the cyclic memory 41 is referred to as storage data.

The communication devices 20 perform cyclic communication at predetermined intervals so as to share the storage data stored in their cyclic memory 41.

Figure 3:
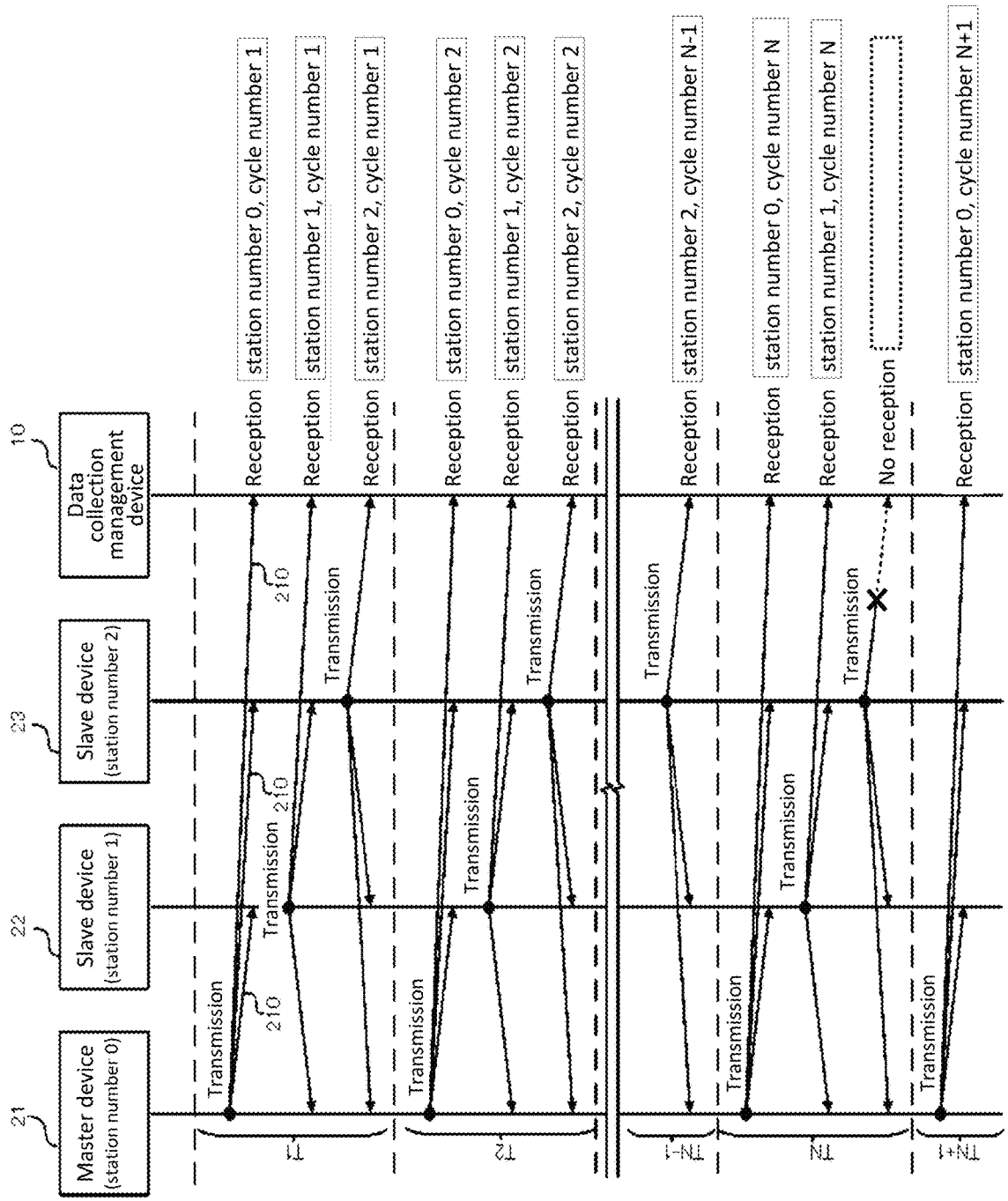
FIG. 3 is a diagram showing communication in each cycle in the data collection system according to the embodiment.

The data collection management device 10 is a device that receives the data transmitted by the communication devices 20 for the cyclic communication and manages the received data. This cyclic communication is performed in such a way that each of the communication devices 20 multicasts data to the data collection management device 10 and to the nodes other than themselves at their predetermined intervals. At that time, the data collection management device 10 does not transmit data for the cyclic communication. This multicast is performed through the switching hub 30. Therefore, the communication devices 20 do not have to recognize the data collection management device 10. FIG. 3 illustrates how the communication like this is carried out.

As shown in FIG. 3, in Cycle T1, each of the communication devices 20 (the master device 21 and the slave devices 22, 23) sequentially transmits (multicasts) the communication data to the other communication devices 20 and to the data collection management device 10 for updating the content of the cyclic memory 41. For example, it is shown by the arrows 210 that the master device 21 transmits the communication data including data for updating the content of the storage areas A21 to the slave devices 22, 23 and the data collection management device 10. Similarly, in Cycle T1, the slave devices 22 and 23 each transmit the communication data for updating the content of the storage areas A22 and A23, respectively, to the other communication devices 20 and the data collection management device 10. Then, by the end of Cycle T1, the content of the cyclic memory 41 is shared by all of the communication devices 20, and the communication data at that time is also collected in the data collection management device 10.

The communication that is similar to that performed in Cycle T1 is performed also in Cycle T2 and later. The length of each cycle is, for example, one microsecond or one millisecond. The master device 21 and the slave devices 22, 23 are precisely time-synchronized based on a time synchronization protocol (for example, the IEEE 1588 Precision Time Protocol defined by the IEEE-1588 standard). The transmission of the communication data by each communication device 20 in the cyclic communication is performed on the basis of the synchronized time. The transmission timings of the communication data by the communication devices 20 in the cyclic communication are defined in advance so as for the communication collision not to occur. The transmission timings of the communication data as well as the cycle length may differ from cycle to cycle.

The station number 0 is assigned to the master device 21, the station number 1 is assigned to the slave device 22, and the station number 2 is assigned to the slave device 23. The communication data transmitted by the communication devices 20 in the cyclic communication each include their station number, which is the information for specifying the sender communication device 20, and a cycle number, which is the information for specifying the communication cycle. The cycle number is an ordinal number to specify which of the cycles the communication data that the data collection device is currently collecting belongs to. The data collection management device 10 is provided, in advance, with network configuration information including the configuration of the communication devices 20 participating in the cyclic communication and their station numbers. The data collection management device 10 can determine whether the data collection is performed normally or not by using the network configuration information, and the station numbers and the cycle numbers included in the communication data.

From the network configuration information, the data collection management device 10 learns that the master device 21 whose station number is "0", the slave device 22 whose station number is "1", and the slave device 23 whose station number is "2" are participating in the cyclic communication. In the example shown in FIG. 3, the data collection management device 10 receives, in Cycle T1, the communication data including the information of "the station number:0, the cycle number:1", the communication data including the information of "the station number:1, the cycle number:1", and the communication data including the information of "the station number:2, the cycle number:1". By this, the data collection management device 10 can determine that it has received the communication data of Cycle T1 (the cycle number:1) from all of the communication devices 20 participating in the cyclic communication. Also in Cycle T2, similarly, the data collection management device 10 receives the communication data including the information of "the station number:0, the cycle number:2", the communication data including the information of "the station number:1, the cycle number:2", and the communication data including the information of "the station number:2, the cycle number:2", which enables the data collection management device 10 to determine that it has received the communication data of Cycle T2 (the cycle number:2) from all of the communication devices 20 participating in the cyclic communication.

On the other hand, in Cycle TN, when the data collection management device 10 receives only the communication data including the information of "the station number:0, the cycle number:N" and the communication data including the information of "the station number:1, the cycle number:N", but does not receive the communication data including the information of "the station number:2, the cycle number:N", the data collection management device 10 can determine that it has failed to receive the communication data from the slave device 23 in Cycle TN. The data collection management device 10 can thereby identify the communication data that it has failed to receive. As for the end of Cycle TN, it can be judged based on the clock of the data collection management device 10 or by receiving the communication data including the information of "the cycle number; N+1" indicating that it is currently Cycle TN+1.

Figure 4:
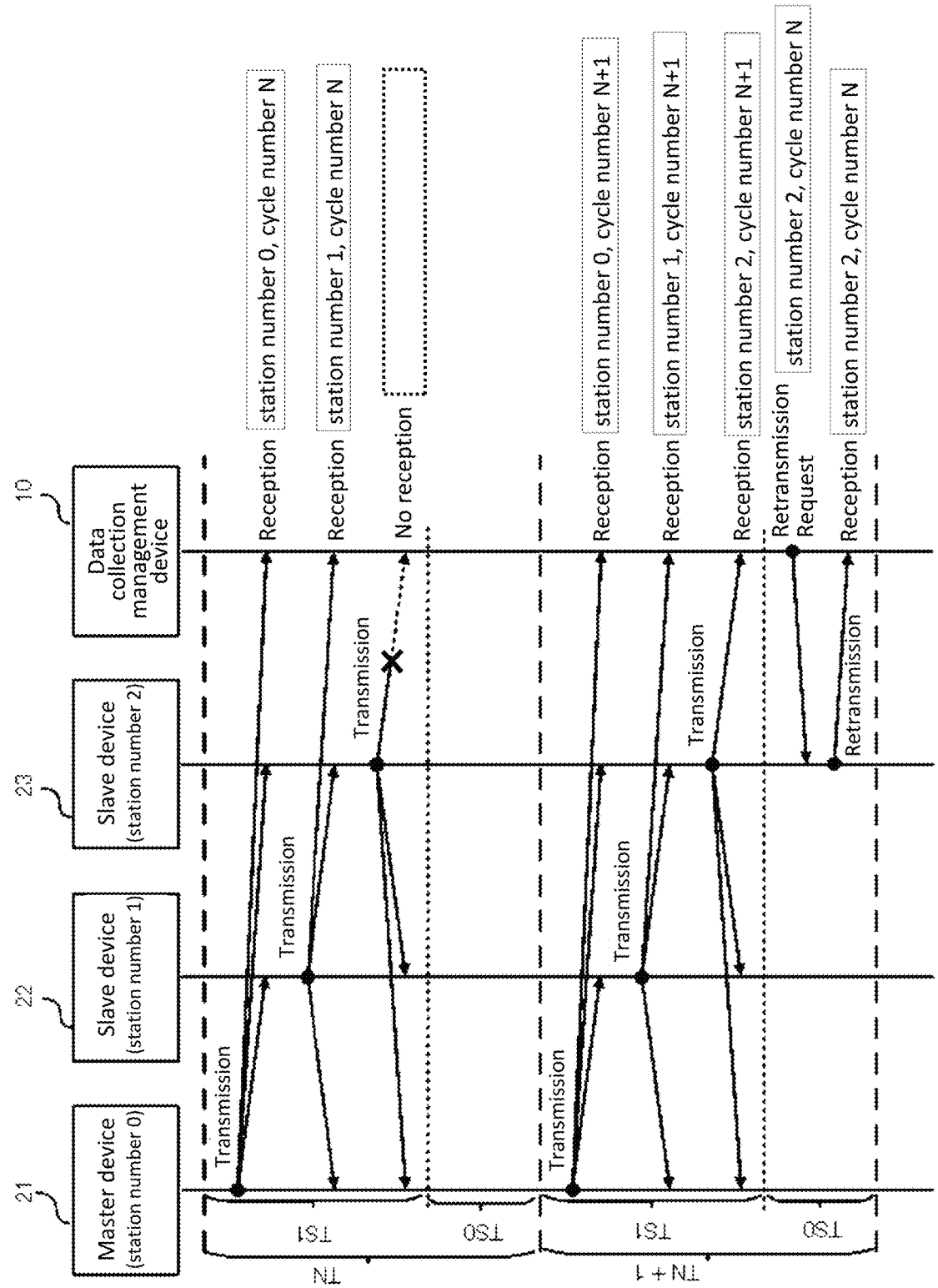
FIG. 4 is a diagram showing communication in each cycle in the data collection system according to the embodiment.

Next, the processing of the data collection management device 10 performed after the failure in the reception of the communication data will be described with reference to FIG. 4. Although not illustrated in FIG. 3, each communication cycle includes two time frames; a cyclic communication period TS1, in which the communication devices 20 participating in the cyclic communication communicate with each other in predetermined timings; and a non-cyclic communication period TS0, in which the communication devices 20 and the data collection management device 10 communicate with each other in optional timings. All of the cyclic communications shown in FIG. 3 are carried out in the cyclic communication periods TS1 of their respective cycles. Note that each of the communication cycles may include another time frame, besides the cyclic communication period TS1 and the non-cyclic communication period TS0, such as a period dedicated to a specific communication protocol. Further, in FIG. 4, in each communication cycle, the cyclic communication period TS1 is provided before the non-cyclic communication period TS0, but their order is not particularly limited to this.

If the reception of the communication data is failed, the data collection management device 10 identifies the station number of the sender as well as the cycle number of the communication data and makes a retransmission request for the communication data to one of the communication devices 20. In the example of FIG. 4, in the non-cyclic communication period TS0 of Cycle TN+1, which is the next cycle of Cycle TN in which the reception of the communication data is failed, a retransmission request is made to the slave device 23 with the communication data specified. Then, the slave device 23 reads the specified communication data from the cyclic memory 41 and retransmits it. The data collection management device 10 receives the retransmitted communication data and, thereby, can collect the data once failed to be received in the cyclic communication. This leads to an improvement in the reliability of the data collection.

Here, the data retransmission request from the data collection management device 10 and the data retransmission from one of the communication devices 20 are carried out in the non-cyclic communication period TS0 of Cycle TN+1. However, the data retransmission request from the data collection management device 10 may be made at a timing within the non-cyclic communication period TS0 of another cycle or at a timing other than the non-cyclic communication period TS0. For example, if the switching hub 30 is set to transmit the communication data for the cyclic communication in preference to the retransmission requesting data, the retransmission requesting data sent in the cyclic communication period TS1 by the data collection management device 10 to a communication device 20 that is the retransmission request destination does not affect the cyclic communication between the communication devices 20. Also, the retransmission from the communication device 20 may take place in the non-cyclic communication period TS0 of the same cycle as the cycle in which the retransmission request is received, or in the non-cyclic communication period TS0 of a cycle later than the cycle in which the retransmission request is received. As the storage data stored in the cyclic memory 41 is shared by the communication devices 20, the retransmission request may be sent to any one of the communication devices 20. A user (factory manager) may determine in advance the retransmission request destination and set it in the data collection management device 10. For example, the master device 21 may be determined as the retransmission request destination. The master device 21 has higher performance than the slave devices 22 and 23 in many cases due to its high processing power or large memory capacity, and thus, is suitable as the retransmission request destination. Instead, the data collection management device 10 may determine the retransmission request destination based on pre-set criteria.

Figure 5:
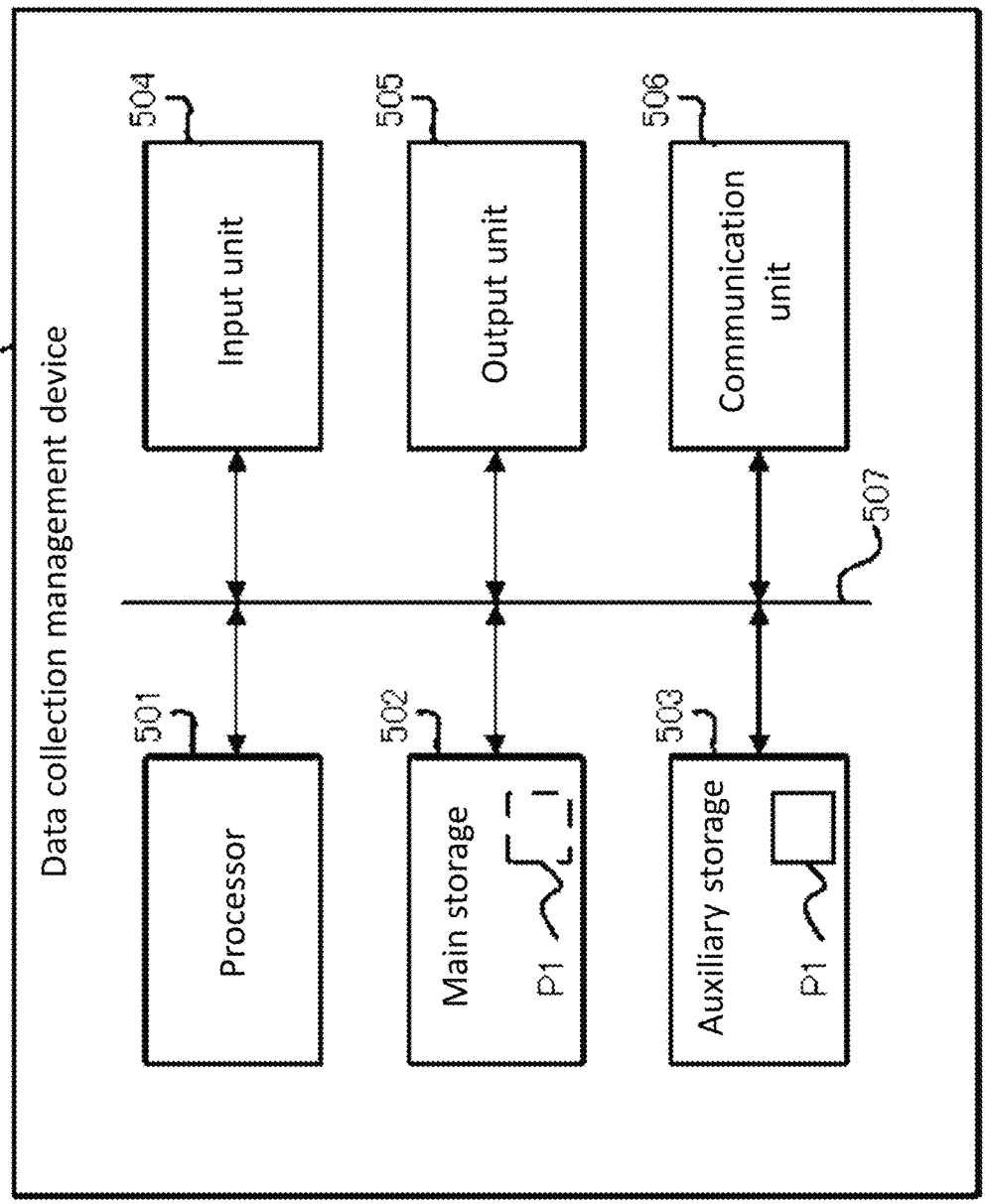
FIG. 5 is a diagram showing a hardware configuration of a data collection management device according to the embodiment.

The data collection management device 10 includes, as its hardware components (e.g., including circuitry) shown in FIG. 5, a processor 501, a main storage 502, an auxiliary storage 503, an input unit 504, an output unit 505, and a communication unit 506. The main storage 502, the auxiliary storage 503, the input unit 504, the output unit 505, and the communication unit 506 are all connected to the processor 501 via an internal bus 407.

The processor 501 includes a central processing unit (CPU). By executing a program P1 stored in the auxiliary storage 503, the processor 501 realizes various functions of the data collection management device 10 to perform the processing described later.

The main storage 502 includes a random-access memory (RAM). The program P1 is loaded from the auxiliary storage 503 into the main storage 502. The main storage 502 is then used as a work area of the processor 501.

The auxiliary storage 503 includes a non-volatile memory represented by an electrically erasable programmable read-only memory (EEPROM) and a hard disk drive (HDD). In addition to the program P1, the auxiliary storage 503 stores various data to be used for the processing of the processor 501. Following the instructions of the processor 501, the auxiliary storage 503 supplies the data to be used by the processor 501 to the processor 501 and stores the data supplied from the processor 501.

The input unit 504 includes an input device represented by an input key and a pointing device. The input unit 504 acquires the information that the user inputs to the data collection management device 10 and informs the processor 501 of the acquired information.

The output unit 505 includes an output device represented by a liquid crystal display (LCD) and a speaker. The output unit 505 presents various information to the user following the instructions of the processor 501.

The communication unit 506 includes a network interface circuit for communicating with an external device. The communication unit 506 receives a signal from the outside and outputs the data indicated by the signal to the processor 501. Further, the communication unit 506 transmits a signal indicating the data outputted from the processor 501 to an external device.

Figure 6:
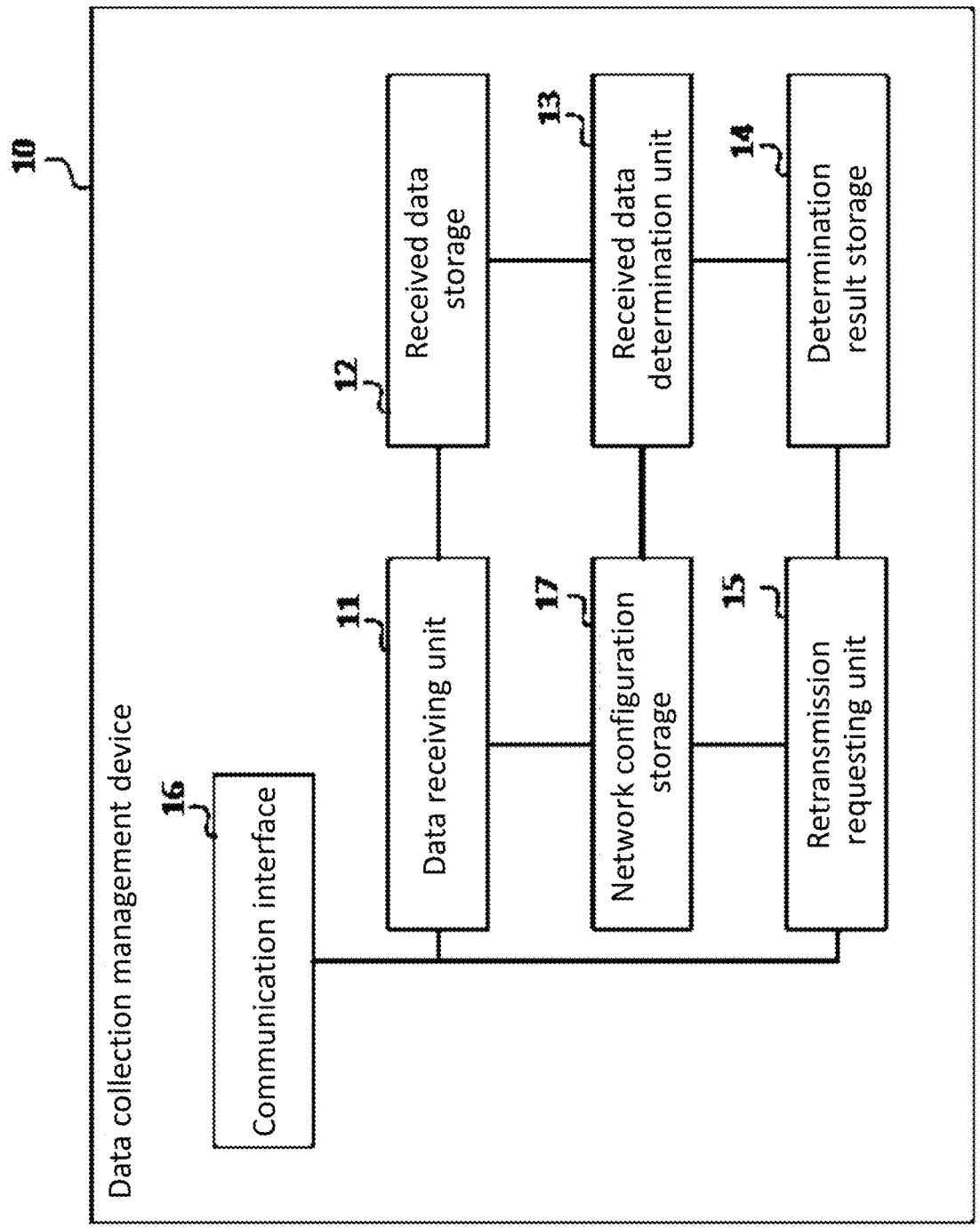
FIG. 6 is a diagram showing a functional configuration of the data collection management device according to the embodiment.

The data collection management device 10 performs various functions through the cooperation of the hardware components shown in FIG. 5. As shown in FIG. 6, the data collection management device 10 includes as its functions: a communication interface 16; a data receiving unit 11 to receive communication data via the communication interface 16; a received data storage 12 to store the received data; a received data determination unit 13 to determine whether there is missing data or a data anomaly such as a bit error in the received data; a determination result storage 14 to store the determination result; a network configuration storage 17 to store network configuration information; and a retransmission requesting unit 15 to determine the retransmission request destination and transmit the retransmission requesting data via the communication interface 16.

The communication interface 16 is realized by the communication unit 506. The communication interface 16 transmits the communication data received via the communication network to the data receiving unit 11, and transmits the retransmission requesting data received from the retransmission requesting unit 15 via the communication network.

The received data storage 12 is mainly realized by the auxiliary storage 503. Some of its functions, such as temporary storage of the received data, are realized by the main storage 502.

Figure 7:
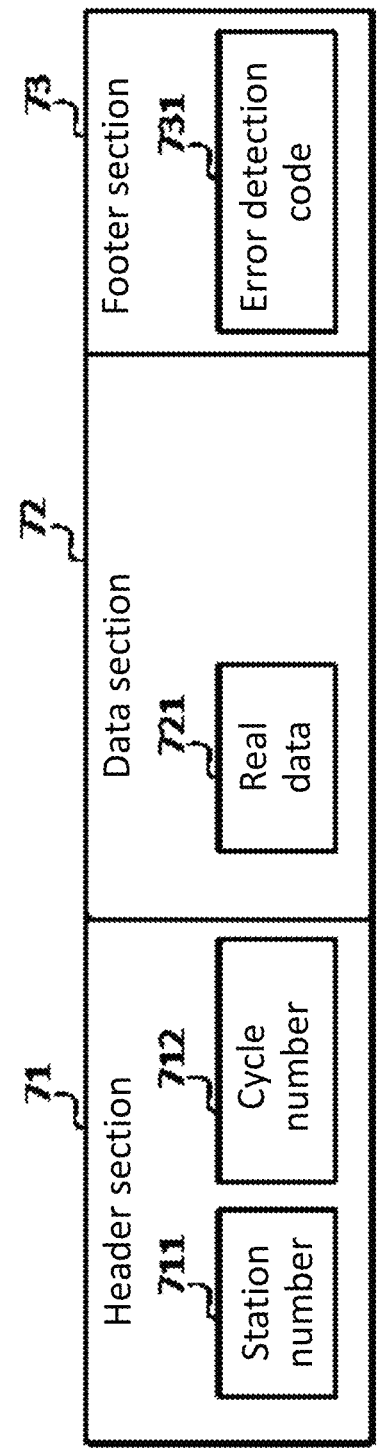
FIG. 7 is a diagram showing a configuration of communication data according to the embodiment.

The data receiving unit 11 is realized by the processor 501. The data receiving unit 11 receives the communication data transmitted from the communication devices 20 via the communication interface 16 and stores the received data in the received data storage 12. The communication data has a frame structure as shown in FIG. 7, for example. The header section 71 includes a station number 711 of a sender communication device 20 and a cycle number 712 for identification of the communication cycle in the cyclic communication. The data section 72 includes real data 721 such as instruction data from the master device 21 to the slave devices 22 and 23 as well as response data from the slave devices 22 and 23 to the master device 21. The footer section 73 includes an error detection code 731. The data receiving unit 11 extracts the station number 711, the cycle number 712, the error detection code 731, and the real data 721 from the received communication data, associates them with each other, and stores them as collected data in the received data storage 12. FIG. 8 shows an example of the way the collected data from Cycle 1 to Cycle 3 are stored. When the communication data is retransmitted from the communication device 20 that has received the retransmission request from the retransmission requesting unit 15, the data receiving unit 11 also extracts, in the same manner as described above, the station number 711, the cycle number 712, the error detection code 731, and the real data 721 of the retransmitted data from the received data, associates them with each other, and stores them as collected data in the received data storage 12.

The network configuration storage 17 is mainly realized by the auxiliary storage 503. However, it may also be realized by the main storage 502. An example of the network configuration information stored in the network configuration storage 17 is shown in FIG. 9. The network configuration information includes the station number, the station type, the address, and the memory amount of each of the communication devices 20 participating in the cyclic communication. The station type is information showing whether each communication device 20 is a master station or a slave station. The address is an address for accessing each of the communication devices 20 from the data collection management device 10, and IP address is an example thereof. The memory amount is the data retention capacity, in other words, the capacity of RAM in each of the communication devices 20. It may also be the memory amount allocated to the cyclic memory 41, out of the RAM capacity. This network configuration information is received by the communication devices 20 from the master device 21 via the communication interface 16 before performing the cyclic communication. The network configuration information may also be inputted by the user via the input unit 504.

The received data determination unit 13 is realized by the processor 501. The received data determination unit 13 compares the collected data stored in the received data storage 12 with the network configuration information stored in the network configuration storage 17 and determines whether there is missing data or a data anomaly due to communication error in the received data. Whether the data is missing or not in the received data is determined, for each communication device 20 included in the network configuration information and for each communication cycle, based on whether the collected data of the station number and the cycle number is stored or not in the received data storage 12. Further, the received data determination unit 13 determines whether there is a data anomaly in the collected data by using the error detection code 731 included in the collected data. The method for determining whether there is an anomaly by using the error detection code 731 may be a general one, and the description thereof is omitted. This determination of whether there is an anomaly is also made for each communication device 20 included in the network configuration information and for each communication cycle.

The function of the determination result storage 14 is mainly realized by the auxiliary storage 503. However, it may be realized by the main storage 502. The determination result storage 14 stores the determination result data given by the received data determination unit 13. An example of the determination result data stored in the determination result storage 14 is shown in FIG. 10. Here, the determination result is shown for the communication in Cycles 1, 2, N, and M. It is shown that the data from a communication device 20 whose station number is 2 in Cycle N has not been received, the data from a communication device 20 whose station number is 1 in Cycle M includes an anomaly, and the rest of the data has been collected normally.

The retransmission requesting unit 15 is realized by the processor 501. The retransmission requesting unit 15 determines the communication data to be targeted by the retransmission request based on the determination result data stored in the determination result storage 14, and transmits the retransmission request to one of the communication devices 20 via the communication interface 16. The retransmission request is made for the data determined in the received data determination unit 13 to be not received or to include an anomaly. This retransmission request is made in the form of one-to-one communication, in which the station number of the sender communication device 20 and the cycle number of the target data are specified in order to identify the communication data to be retransmitted. As described above, the retransmission request is made in the non-cyclic communication period TS0 so as not to interfere with the cyclic communication between the communication devices 20.

Next, the communication devices 20 (the master device 21, the slave devices 22, 23) will be described. Each of the communication devices 20 can be realized with the same hardware configuration as the data collection management device 10. Specifically, they can be realized by the configuration shown in FIG. 5.

Here, the detailed description of the hardware configuration is omitted, but FIG. 5 is also used to describe the functional configuration of the communication devices 20. The data collection management device 10 is equipped with a non-real-time OS, while each of the communication devices 20 is equipped with a real-time OS.

Figure 11:
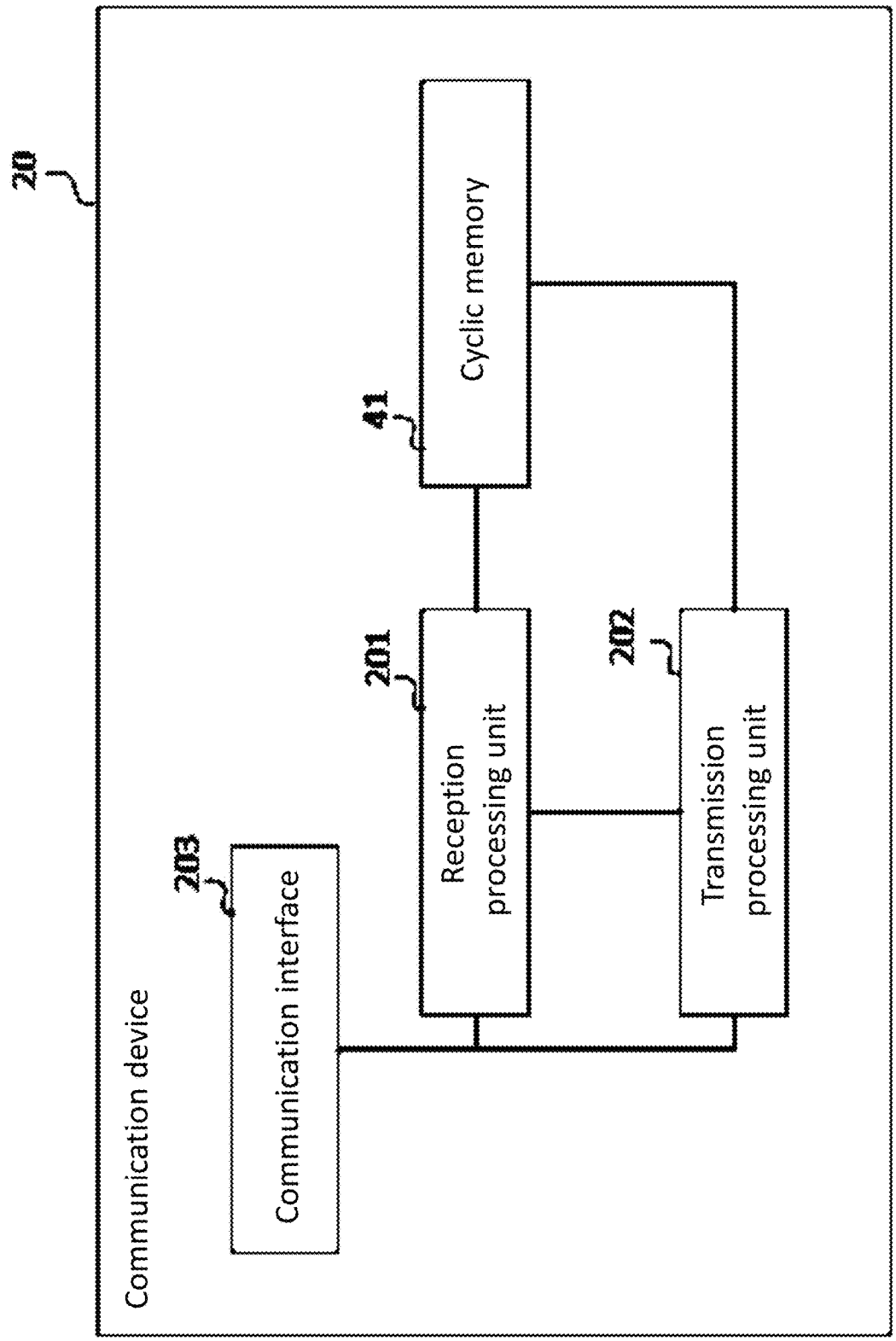
FIG. 11 is a diagram showing a functional configuration of a communication device according to the embodiment.

Each of the communication devices 20 performs various functions through the cooperation of the components in the hardware configuration which is similar to that of FIG. 5. In detail, as shown in FIG. 11, each of the communication devices 20 includes, as its functions, a cyclic memory 41, a communication interface 203 to transmit and receive the communication data via the communication network, a reception processing unit 201 to process the communication data received via the communication interface 203, and a transmission processing unit 202 to execute the processing of transmitting the communication data via the communication interface 203.

The cyclic memory 41 is mainly realized by the main storage 502. Not being limited to this, however, the cyclic memory 41 may be realized by the auxiliary storage 503.

The communication interface 203 is realized by the communication unit 506. The communication interface 203 transmits the communication data received via the communication network to the reception processing unit 201 and transmits the communication data transmitted from the transmission processing unit 202 via the communication network.

The reception processing unit 201 is realized by the cooperation of the processor 501 and the main storage 502. The reception processing unit 201 analyzes the received communication data and informs the transmission processing unit 202 of the analysis result. When the received data is the data of the cyclic communication, the reception processing unit 201 extracts the necessary data from the communication data and stores it in the cyclic memory 41. On the other hand, when the received data is data for the retransmission request from the data collection management device 10, the reception processing unit 201 extracts the information necessary for the retransmission processing such as the information for identifying the requested data and informs the transmission processing unit 202 of the extracted information.

The transmission processing unit 202 is realized by the cooperation of the processor 501 and the main storage 502. The transmission processing unit 202 generates the communication data according to the analysis result given by the reception processing unit 201. When the communication data to be transmitted is data for the cyclic communication, a transmission data generation unit 441 reads the necessary data from the cyclic memory 41, generates the communication data, and transmits (multicasts), via the communication network, the generated data from the communication interface 203 at a predetermined timing in the cyclic communication period TS1. This communication data has, as described above, a configuration as shown in FIG. 7, for example. When the communication data to be transmitted is data for responding the retransmission request from the data collection management device 10, the transmission data generation unit 441 reads the requested data from the cyclic memory 41, generates the communication data, and transmits (unicasts) the generated data to the data collection management device 10 via the communication interface 203 in the non-cyclic communication period TS0.

Figure 12:
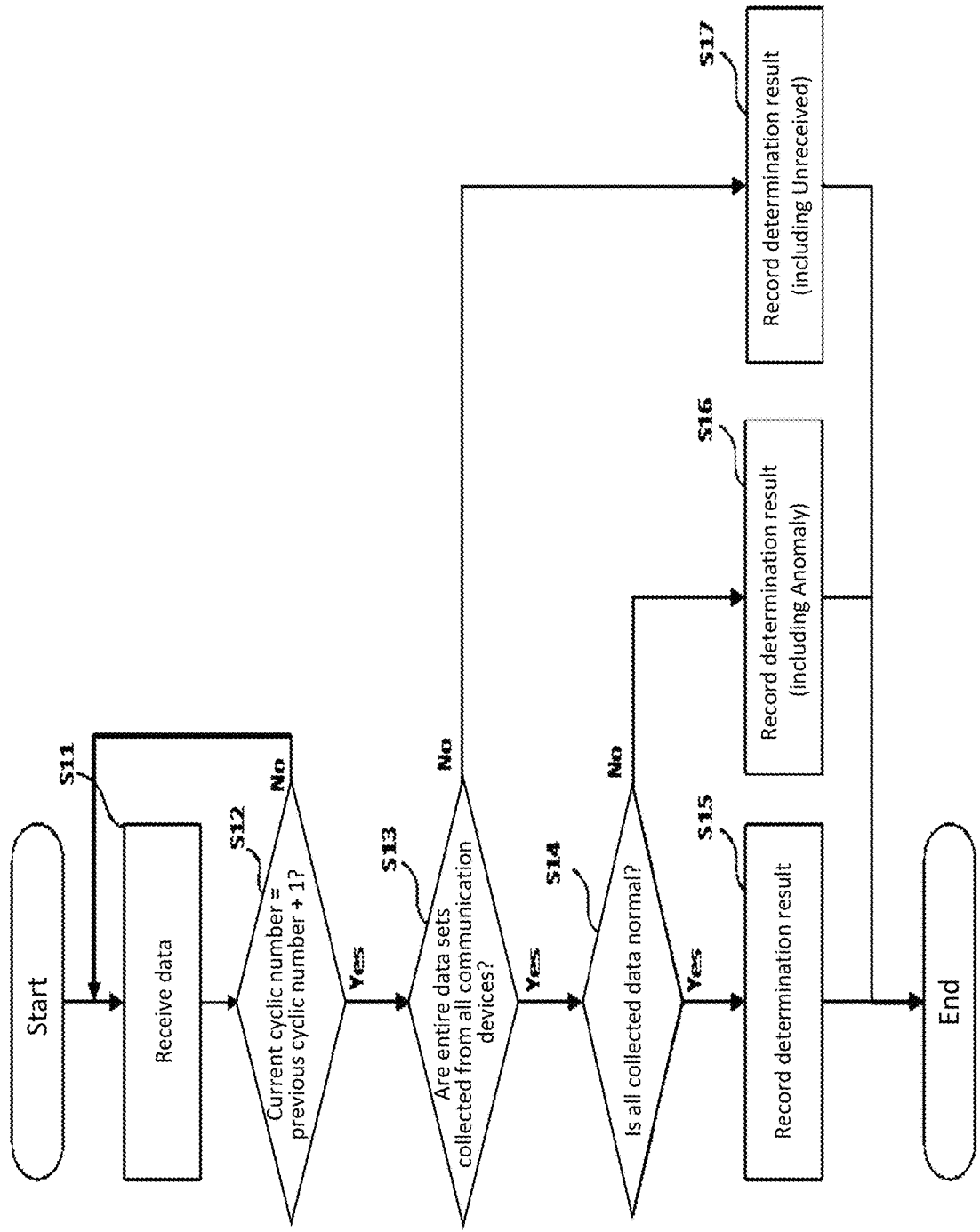
FIG. 12 is a flowchart showing reception processing of data and determination processing of the received data in the data collection management device according to the embodiment.
Figure 13:
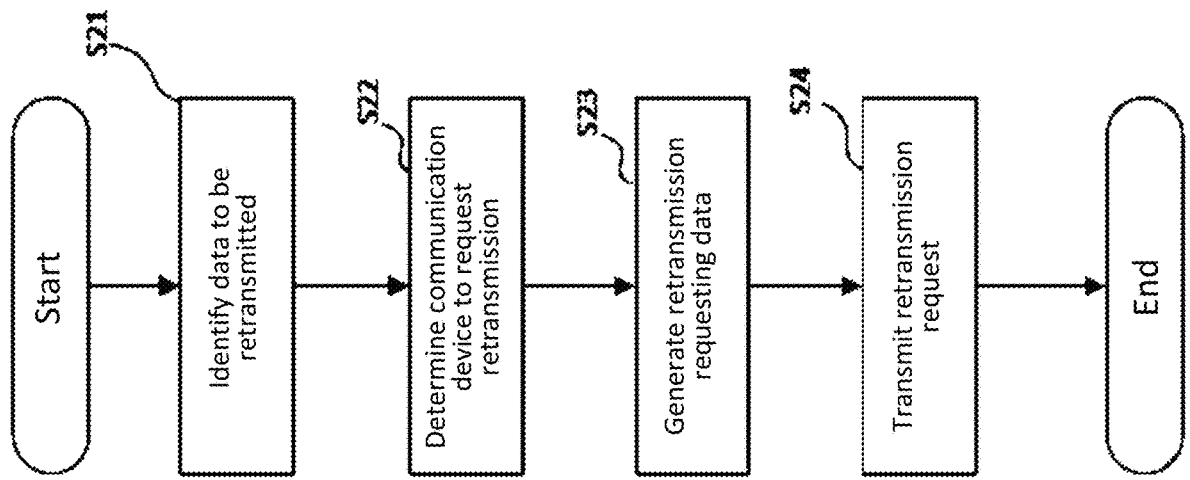
FIG. 13 is a flowchart showing retransmission request processing in the data collection management device according to the embodiment.
Figure 14:
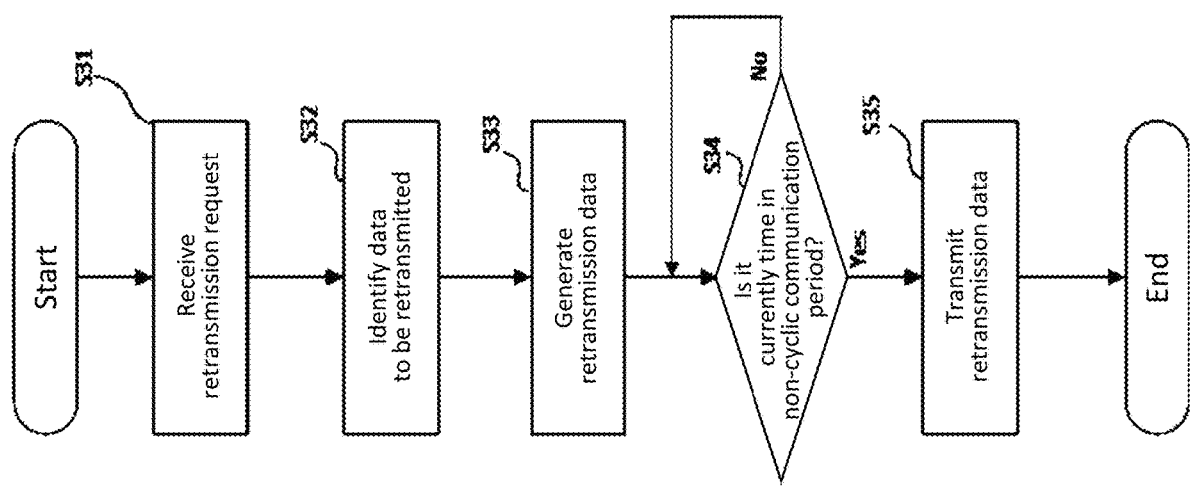
FIG. 14 is a flowchart showing retransmission processing in the communication device according to the embodiment.

Next, the data collection process performed in the data collection system 1000 will be described using FIGS. 12 to 14.

The data reception and the determination processing of the received data performed by the data collection management device 10 will be described with reference to FIG. 12. First, the data receiving unit 11 receives the communication data via the communication interface 16. The data receiving unit 11 extracts the station number, the cycle number, the error detection code, the real data and the like from the communication data, associates them with each other, and stores them as collected data in the received data storage 12 (S11).

Next, the received data determination unit 13 compares the cycle number included in the latest communication data with the cycle number included in the previously received communication data (S12). If the cycle number is not incremented, the processing step returns to the data receiving step (S11), and the data receiving unit 11 receives the next communication data. If the cycle number is incremented by one, the received data determination unit 13 considers that the communication processing in the previous cycle is completed, and the processing step proceeds to the step of determining whether there is missing data or not in the received data (S13). Here, with regard to the previous cycle, the received data determination unit 13 determines whether the entire data sets to be collected from each of the communication devices 20 that are indicated as the participants of the cyclic communication are stored in the received data storage 12. The communication devices 20 participating in the cyclic communication can be identified by using the network configuration information. Among the communication devices 20 participating in the cyclic communication, if there is a communication device whose data to be collected is not stored in the received data storage 12, it can be determined that the communication data from this communication device 20 has not been received. In this case, the determination result is stored together with the sender's station number and the cycle number of the unreceived data in the determination result storage 14 (S17). On the other hand, if the entire data sets to be collected from each of the communication devices 20 are stored in the received data storage 12, then the received data determination unit 13 determines whether there is a data anomaly (bit error) by using the error detection codes stored in the received data storage 12 (S14). If there is no data anomaly, the determination result that the received communication data is normal is stored in the determination result storage 14 (S15).

On the other hand, if there is a data anomaly, the data that includes the anomaly is identified, and the determination result is stored together with the station number and the cycle number of the data including the anomaly in the determination result storage 14 (S16). The retransmission request processing is started when the determination result that the data is not received or has a data anomaly is stored in the determination result storage 14. It is desirable that the retransmission request processing be performed promptly when retransmission of data is required. Therefore, the retransmission requesting unit 15 regularly monitors the information stored in the determination result storage 14.

When the retransmission request processing is started, the retransmission requesting unit 15 identifies the retransmission data to be targeted by the retransmission request by using the determination result in the determination result storage 14 (S21). Here, the station number and the cycle number of the communication data to be targeted by the retransmission request are identified.

Next, the retransmission requesting unit 15 determines the communication device 20 which is the destination of the retransmission request. Here, the retransmission request destination is determined based on the memory amount of each of the communication devices 20 and the round-trip time (RTT) between the data collection management device 10 and each communication device 20. The data retention period of each cyclic memory 41 depends on the memory amount of each of the communication devices 20. Therefore, by requesting retransmission of the communication data for a communication device 20 with large memory amount, the possibility that the communication device 20 is holding the necessary data is increased, which leads to higher certainty of the success in the retransmission request. Here, the communication device with the largest memory amount is selected as the retransmission request destination. If there are a plurality of the communication devices with the largest memory amount, the communication device with the shortest round-trip time among those is selected as the retransmission request destination. The round-trip times are measured in advance by the data collection management device 10. The measurements of the round-trip times are performed in the non-cyclic communication periods TS0.

Next, the retransmission requesting unit 15 generates the retransmission requesting data (S23). The retransmission requesting data includes information on the station number and the cycle number of the communication data requested to be retransmitted. The retransmission request is made in the form of one-to-one communication. The retransmission requesting unit 15 generates the retransmission requesting data whose destination is represented by the IP address of the determined retransmission request destination.

Then, the retransmission requesting unit 15 transmits the retransmission requesting data to the determined retransmission request destination via the communication interface 16 (S24).

Next, the retransmission processing performed by each communication device 20 will be described with reference to FIG. 14. First, the reception processing unit 201 receives the retransmission requesting data via the communication interface 203 (S31). Next, the reception processing unit 201 analyzes the retransmission requesting data and extracts the data for identifying the data which is required to be retransmitted (S32). Specifically, the communication data to be retransmitted is identified by the cycle number and the station number. At this time, the information of the destination to be used at the time of retransmission, for example, the IP address of the data collection management device 10, is also extracted from the retransmission requesting data.

Next, the transmission processing unit 202 reads the data for the retransmission from the cyclic memory 41 and generates the retransmission data (S33). The retransmission data includes the cycle number, the station number, and the real data of the communication data to be retransmitted and is generated with the IP address of the data collection management device 10 set as the destination. Then, the transmission processing unit 202 determines if it is currently the time in the non-cyclic communication period TS0 (S34), and transmits the retransmission data to the data collection management device 10 via the communication interface 203 in the non-cyclic communication period TS0.

As described above, the data collection management device 10 according to the embodiment does not participate in the cyclic communication between the communication devices but collects the communication data by receiving data which is multicast from each of the communication devices participating in the cyclic communication. In doing so, this data collection management device is able to identify the missing data or the data with anomaly by using the station number and the cycle number included in the communication data and, thus, is able to reacquire the collected data by requesting retransmission of the data from one of the communication devices.

It should be noted that, although there is a high possibility that the reception of the communication data fails due to the nature of the OS when the data collection management device 10 is equipped with a non-real-time OS, the data collection management device 10 according to the embodiment can ensure the reliability of the data collection even when it operates under a non-real-time OS. If the real-time OS is installed in the data collection management device 10, complicated data analysis can be performed with the same device, so that there is no need to introduce a separate device for analysis, which leads to cost reduction for equipment and operation.

The data collection management device 10 according to the embodiment does not participate in the cyclic communication between the communication devices but collects the communication data by receiving data which is multicast from each of the communication devices participating in the cyclic communication, and further, the retransmission requesting data and the retransmission data are transmitted in the non-cyclic communication period TS0. Therefore, the data collection can be performed without affecting the cyclic communication between the communication devices 20.

In the embodiment, the communication devices 20 are specified using the station numbers, but if the communication devices 20 can be specified, identifiers other than numbers may be used. For example, each of the communication devices 20 may be given a device name and specified by the device name.

In the embodiment, the data collection management device 10 and the communication devices 20 are connected in a star type network in which the devices are connected via the switching hub 30. However, the network topology may be different from a star type. For example, in a case where the data collection management device 10 is located at the terminal, the network topology of the communication network may be a bus type, a line type, or a hybrid of a star type and a line type.

This disclosure may lead to various embodiments and modifications within its broadest spirit and scope thereof. Also, the embodiment is intended to illustrate the disclosure, not to limit the scope thereof. In other words, the scope of this disclosure is given by the claims, not by the embodiment. And various modifications made within the scope of the claims and within the meanings of the disclosure equivalent to the claims are regarded as being within the scope of this disclosure.

DESCRIPTION OF SYMBOLS 10 data collection management device,
11 data receiving unit,
12 received data storage,
13 received data determination unit,
14 determination result storage,
15 retransmission requesting unit,
16 communication interface,
17 network configuration storage,
20 communication device,
21 master device,
22 slave device,
23 slave device,
30 switching hub,
41 cyclic memory,
50 communication network,
71 header section,
72 data section,
73 footer section,
201 reception processing unit,
202 transmission processing unit,
203 communication interface,
210 arrow,
407 internal bus,
441 transmission data generation unit,
501 processor,
502 main storage,
503 auxiliary storage,
504 input unit,
505 output unit,
506 communication unit,
711 station number,
712 cycle number,
721 real data,
731 error detection code,
1000 data collection system

The invention claimed is:

1. A data collection management device to be connected via a network to a plurality of communication devices performing cyclic communication to share storage data stored in storage, the data collection management device comprising:

a network configuration storage to store network configuration information fir identifying the plurality of communication devices participating in the cyclic communication;

data receiving circuitry to receive communication data which is multicast in the cyclic communication from each of the plurality of communication devices;

a received data storage to store the communication data received by the data receiving circuitry as collected data;

received data determination circuitry to determine whether there is missing data in the collected data and to identify a communication cycle and a sender communication device of unreceived communication data, based on information included in the collected data, representing which communication cycle in the cyclic communication the communication data belongs to, on information included in the collected data, representing sender communication devices of the communication data, and on the network configuration information; and retransmission requesting circuit: to transmit to one of the plurality of communication devices retransmission requesting data for requesting retransmission of the communication data identified by the received data determination circuitry as not being received when it is determined hi the received data. determination circuitry that there is missing data in the collected data, wherein the network configuration information further includes information. on data retention capacity of the plurality of communication devices, the retransmission requesting circuitry determines a communication device to which the retransmission requesting data is to be transmitted based on information on data. retention capacity of the plurality of communication devices, and the retransmission requesting circuitry transmits the retransmission requesting data to a communication device having the largest data retention capacity.

2. The data collection management device according to claim 1, wherein the network configuration information includes information on whether each of the plurality of communication devices is a master station or a slave station, and the retransmission requesting circuitry transmits the retransmission requesting data to a communication device which is the master station among the plurality of communication devices.

3. The data collection management device according to claim 1, wherein the retransmission requesting circuitry determines the communication device to which the retransmission requesting data is to be transmitted based on a round-trip time (RTT) between the data collection management device and each of the plurality of communication devices.

4. A data collection system comprising a plurality of communication devices performing cyclic communication to share storage data stored in storage and a data collection management device to be connected to the plurality of communication devices via a network, wherein communication data transmitted from each of the plurality of communication devices in the cyclic communication includes information representing which communication cycle in the cyclic communication the communication data belongs to and information representing a sender communication device of the communication data, and the data collection management device includes:
a received data storage to receive the communication data and store it as collected data;
received data determination circuitry to determine whether there is missing data in the collected data and to identify a communication cycle and a sender communication device of unreceived communication data, based on information included in the collected data and information stored in advance to identify the plurality of communication devices participating in the cyclic communication; and
retransmission requesting circuitry to transmit to one of the plurality of communication devices retransmission requesting data for requesting retransmission of the communication data identified by the received data determination circuitry as not being received when it is determined in the received data determination circuitry that there is missing data in the collected data, wherein
the retransmission requesting circuitry determines a communication device to which the retransmission requesting data is to be transmitted based on information on data retention capacity of the plurality of communication devices; and
wherein the retransmission requesting circuitry transmits the retransmission requesting data to a communication device having the largest data retention capacity.

5. The data collection system according to claim 4, wherein
each of the communication cycles includes a cyclic communication period in which the cyclic communication is performed and a non-cyclic communication period in which communication other than the cyclic communication is performed, and
among the plurality of communication devices, a communication device that receives the retransmission requesting data transmits communication data requested to be retransmitted to the data collection management device in the non-cyclic communication period.

6. The data collection system according to claim 4, wherein the retransmission requesting circuitry determines the communication device to which the retransmission requesting data is to be transmitted based on a round-trip time (RTT) between the data collection management device and each of the plurality of communication devices.

7. A data collection management device to be connected via a network to a plurality of communication devices performing cyclic communication to snare storage data stored in storage,. the data collection management device comprising:
a network configuration storage to store network configuration information for identifying the plurality of communication devices participating in the cyclic communication;
data receiving circuitry to receive communication data which is multicast in the cyclic communication from each of the plurality of communication devices;
a received data storage to store the communication data received by the data receiving circuitry as collected data;
received data determination circuitry to determine whether there is missing data in the collected data and to identify a communication cycle and a sender communication device of unreceived communication data, based on information included in the collected data, representing which communication cycle in the cyclic communication the communication data belongs to, on information included in the collected data, representing sender communication devices of the communication data, and on the network configuration information; and
a retransmission requesting unit to transmit to one of the plurality of communication devices retransmission requesting data for requesting retransmission of the communication data identified by the received data determination circuitry as not being received when it is determined in the received data determination circuitry that there is missing data in the collected data, wherein
the network configuration information further includes information on data retention capacity of the plurality of communication devices,
the retransmission requesting unit determines a communication device to which the retransmission requesting data is to be transmitted based on information on data retention capacity of the plurality of communication devices, and
the retransmission requesting unit transmits the retransmission requesting data to a communication device having the largest data retention capacity.

8. The data collection management device according to claim 7, wherein the retransmission requesting unit determines the communication device to which the retransmission requesting data is to be transmitted based on a round-trip time (RTT) between the data collection management device and each of the plurality of communication devices.

* * * * *